UNITED STATES PATENT OFFICE.

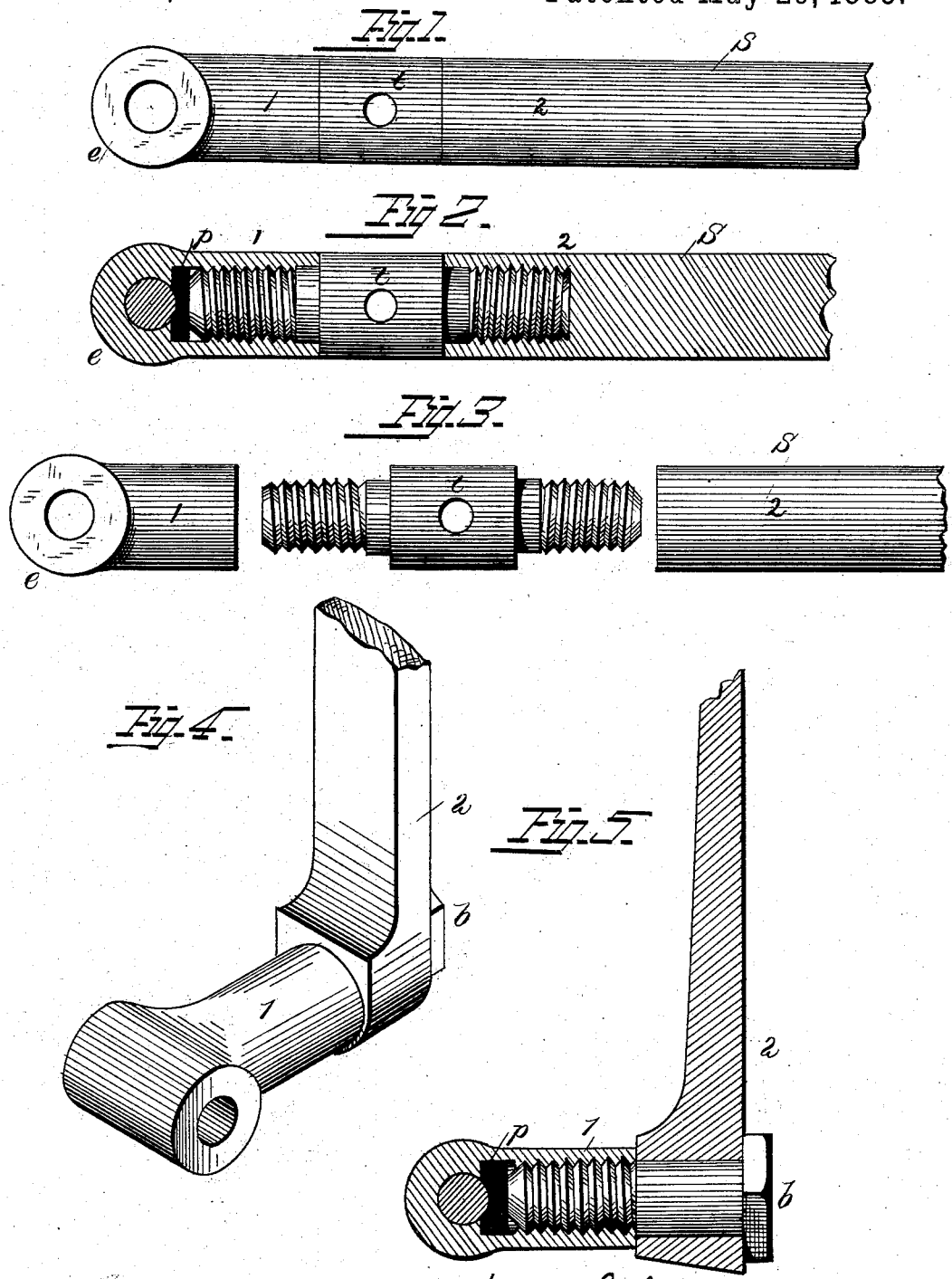

JOHN W. KELLEY, OF MANCHESTER, VERMONT.

THILL-COUPLING.

SPECIFICATION forming part of Letters Patent No. 278,339, dated May 29, 1883.

Application filed October 23, 1882. (Model.)

*To all whom it may concern:*

Be it known that I, JOHN WILLIAM KELLEY, a citizen of the United States, residing at Manchester, in the county of Bennington and State of Vermont, have invented certain new and useful Improvements in Shaft-Couplings for Carriages; and I do hereby declare the following to be a full, clear, and exact description of the same.

My invention relates to carriage shafts or poles made in parts or sections arranged for ready connection to or disconnection from each other, and also to the prevention of rattling.

Reference being had to the accompanying drawings, which form a part of this specification—

Figure 1 represents in perspective the rear end of a shaft or pole with all the parts joined for use. Fig. 2 represents in longitudinal section the same, except that the turn-buckle $t$ appears in relief. Fig. 3 represents the parts disconnected. Fig. 4 represents in perspective a modification. Fig. 5 represents a longitudinal section of the same.

The shaft S is divided near its rear end into two portions, 1 and 2, having screw-cavities in their respective proximate ends, one with right and the other with left pitch. Into these cavities the screw ends of the turn-buckle $t$ are fitted, in order readily to connect the portions 1 and 2 together and as readily disconnect them from each other. The screw-cavity of the rear portion, 1, is prolonged beyond the screw-thread to the eye $e$, and contains the packing $p$, in order to prevent rattling. This packing is pressed, when in use, by the turn-buckle against the bolt which passes through the eye, and thus secures the shaft in the usual manner to a clip or other device attached to the axle.

It will be seen that there are no projections at the joints to receive accidental injurious knocks from whiffletrees, &c.

In the modification the portions 1 and 2 are joined at a right angle, or at any desirable angle, and the bolt $b$ takes the place of the turn-buckle $t$.

I do not claim, broadly, the prevention of rattling by means of a screw working in a shaft, since that feature is shown in the patent of Cyrus E. Gillespie, Henry J. Springer, and Frederick J. Springer, No. 207,115, dated August 20, 1878.

I claim as my invention and desire to secure by Letters Patent—

A carriage shaft or pole made in sections united by a screw, which also presses against the connection with the axle in order to prevent rattling.

In testimony whereof I have signed my name to this specification in the presence of two witnesses.

JOHN W. KELLEY.

Witnesses:
M. H. DOLITTLE,
WALKER R. WILCOX.